(12) United States Patent
Lin et al.

(10) Patent No.: US 12,079,413 B2
(45) Date of Patent: Sep. 3, 2024

(54) COMPUTING DEVICE ENCLOSURE ENCLOSING A DISPLAY AND FORCE SENSORS

(71) Applicant: Apple Inc., Cupertino, CA (US)

(72) Inventors: Hung Sheng Lin, San Jose, CA (US); ByoungSuk Kim, Palo Alto, CA (US); Jun Qi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/123,185

(22) Filed: Mar. 17, 2023

(65) Prior Publication Data

US 2023/0229252 A1 Jul. 20, 2023

Related U.S. Application Data

(63) Continuation of application No. 17/475,113, filed on Sep. 14, 2021, now Pat. No. 11,609,650, which is a continuation of application No. 16/422,727, filed on May 24, 2019, now abandoned.

(51) Int. Cl.
*G06F 3/041* (2006.01)
*G06F 1/16* (2006.01)

(52) U.S. Cl.
CPC .......... *G06F 3/0414* (2013.01); *G06F 1/1616* (2013.01); *G06F 1/1643* (2013.01); *G06F 1/1681* (2013.01)

(58) Field of Classification Search
CPC .... G06F 3/0414; G06F 1/1616; G06F 1/1643; G06F 1/1681
See application file for complete search history.

(56) References Cited

U.S. PATENT DOCUMENTS

| | | |
|---|---|---|
| 3,750,127 A | 7/1973 | Ayers et al. |
| 4,575,917 A | 3/1986 | Kana |
| 4,754,645 A | 7/1988 | Piche |
| 5,831,170 A | 11/1998 | Sokn |
| 6,250,863 B1 | 6/2001 | Kamentser et al. |
| 6,474,922 B2 | 11/2002 | Bachman et al. |
| 6,731,219 B1 | 5/2004 | Wheat et al. |
| 7,220,016 B2 | 5/2007 | Matthews et al. |
| 7,656,393 B2 | 2/2010 | King et al. |
| 8,132,782 B2 | 3/2012 | Duelli et al. |
| 8,698,777 B2 | 4/2014 | Endo et al. |
| 8,743,309 B2 | 6/2014 | Mathew et al. |
| 9,829,397 B2 | 11/2017 | Lukens et al. |
| 9,832,868 B1 * | 11/2017 | Wright .................. G06F 3/041 |
| 10,180,747 B2 | 1/2019 | Liu et al. |
| 10,324,557 B2 | 6/2019 | Lu et al. |
| 10,481,719 B2 | 11/2019 | Ma et al. |
| 10,545,534 B2 | 1/2020 | Ent et al. |
| 10,636,848 B2 | 4/2020 | Shen et al. |

(Continued)

*Primary Examiner* — Ryan A Lubit
(74) *Attorney, Agent, or Firm* — Brownstein Hyatt Farber Schreck, LLP

(57) ABSTRACT

Embodiments described herein generally take the form of an electronic device including a primary and secondary display; at least the secondary display is force-sensitive and further has its force-sensing circuitry in-plane with the display. The secondary display and force-sensing circuitry may be encapsulated between two glass layers that are bonded to one another by a frit. In some embodiments the force-sensing circuitry is formed from, or constitutes part of, the frit.

18 Claims, 4 Drawing Sheets

(56) References Cited

U.S. PATENT DOCUMENTS

| | | |
|---|---|---|
| 10,817,091 B2 | 10/2020 | Kim et al. |
| 11,080,501 B2 | 8/2021 | Kim et al. |
| 2006/0238517 A1* | 10/2006 | King .................... G06F 1/1637 345/173 |
| 2008/0202251 A1 | 8/2008 | Serban et al. |
| 2011/0109829 A1* | 5/2011 | Mathew .............. G02F 1/13454 445/24 |
| 2014/0333035 A1 | 11/2014 | Schemmann et al. |
| 2017/0131840 A1* | 5/2017 | Deichmann ............. G06F 3/044 |
| 2017/0221971 A1* | 8/2017 | Shen ...................... H10K 59/40 |
| 2017/0242518 A1* | 8/2017 | Liu ....................... G06F 3/0443 |
| 2017/0277296 A1* | 9/2017 | Reynolds .............. G06F 3/0412 |
| 2017/0315653 A1* | 11/2017 | Vandermeijden ... G06F 3/04164 |
| 2018/0188774 A1* | 7/2018 | Ent ........................ G06F 1/1616 |
| 2018/0210598 A1* | 7/2018 | Lu ........................... G06F 3/016 |
| 2018/0246365 A1* | 8/2018 | Choi .................. G02F 1/13336 |
| 2019/0025970 A1* | 1/2019 | Kim .................. G02F 1/136286 |
| 2019/0204977 A1* | 7/2019 | Ma ....................... G06F 3/04164 |
| 2019/0205595 A1* | 7/2019 | Gong ................. G06V 40/1306 |
| 2020/0371632 A1 | 11/2020 | Lin |
| 2022/0004279 A1 | 1/2022 | Lin |

\* cited by examiner

COMPUTING DEVICE ENCLOSURE ENCLOSING A DISPLAY AND FORCE SENSORS

CROSS-REFERENCE TO RELATED APPLICATION

This application is a continuation of U.S. patent application Ser. No. 17/475,113, filed Sep. 14, 2021, which is a continuation of U.S. patent application Ser. No. 16/422,727, filed May 24, 2019, now Abandoned, the contents of which are incorporated herein by reference as if fully disclosed herein.

FIELD

Embodiments described herein generally relate to electronic devices having a display with a force sensor about, and coplanar with, the display.

BACKGROUND

Electronic devices typically include a display to provide visual information to a user. In many cases these displays are touch-sensitive. Touch sensing, while useful, is limited. Touch-sensitive displays can detect where a user touches, but not an amount of force exerted on the touch-sensitive surface.

Further, electronic devices have become increasingly thinner and lighter over time, thereby enhancing portability. This drive towards compact devices reduces the amount of space available for components of electronic devices, especially with respect to components layered or positioned atop one another (e.g., along a thickness or "Z-axis" of a device).

SUMMARY

Embodiments described herein generally relate to electronic devices, and particularly electronic devices having a display with a force sensor positioned at least partially around, and coplanar with, the display.

One embodiment described herein takes the form of a computing device, comprising: an enclosure; a display positioned at least partially within the enclosure and comprising: a display layer; a top encapsulant above the display layer; a bottom encapsulant below the display layer; and a sidewall connecting the top encapsulant to the bottom encapsulant and extending about the display layer; force-sensing circuitry positioned at least partially about the display layer; and a circuit extending from the force-sensing circuitry through a portion of the sidewall; wherein: the force-sensing circuitry is positioned either within the sidewall or between the display and the sidewall.

Another embodiment takes the form of a portable computing device, comprising: an enclosure; a display at least partially within the enclosure; a force sensor coplanar with a portion of the display and within the enclosure; an encapsulant surrounding the force sensor and within the enclosure; wherein: the force sensor is configured to measure a change in capacitance in response to an input force exerted on the display; and the force sensor is configured to measure the change in capacitance with respect to the enclosure.

Still another embodiment takes the form of a computing device, comprising: a touch-sensitive display comprising a display layer and configured to accept an input; force-sensing circuitry configured to detect a force of the input; a processing unit operably connected to the force-sensing circuitry and configured to estimate an amount of the force based on an output of the force-sensing circuitry; an encapsulant forming a portion of the display and encapsulating the force-sensing circuitry; an enclosure enclosing the force-sensing circuitry, processing unit, and at least a portion of the touch-sensitive display; wherein: the force-sensing circuitry surrounds at least a portion of the display; and the force-sensing circuitry is coplanar with the display layer.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
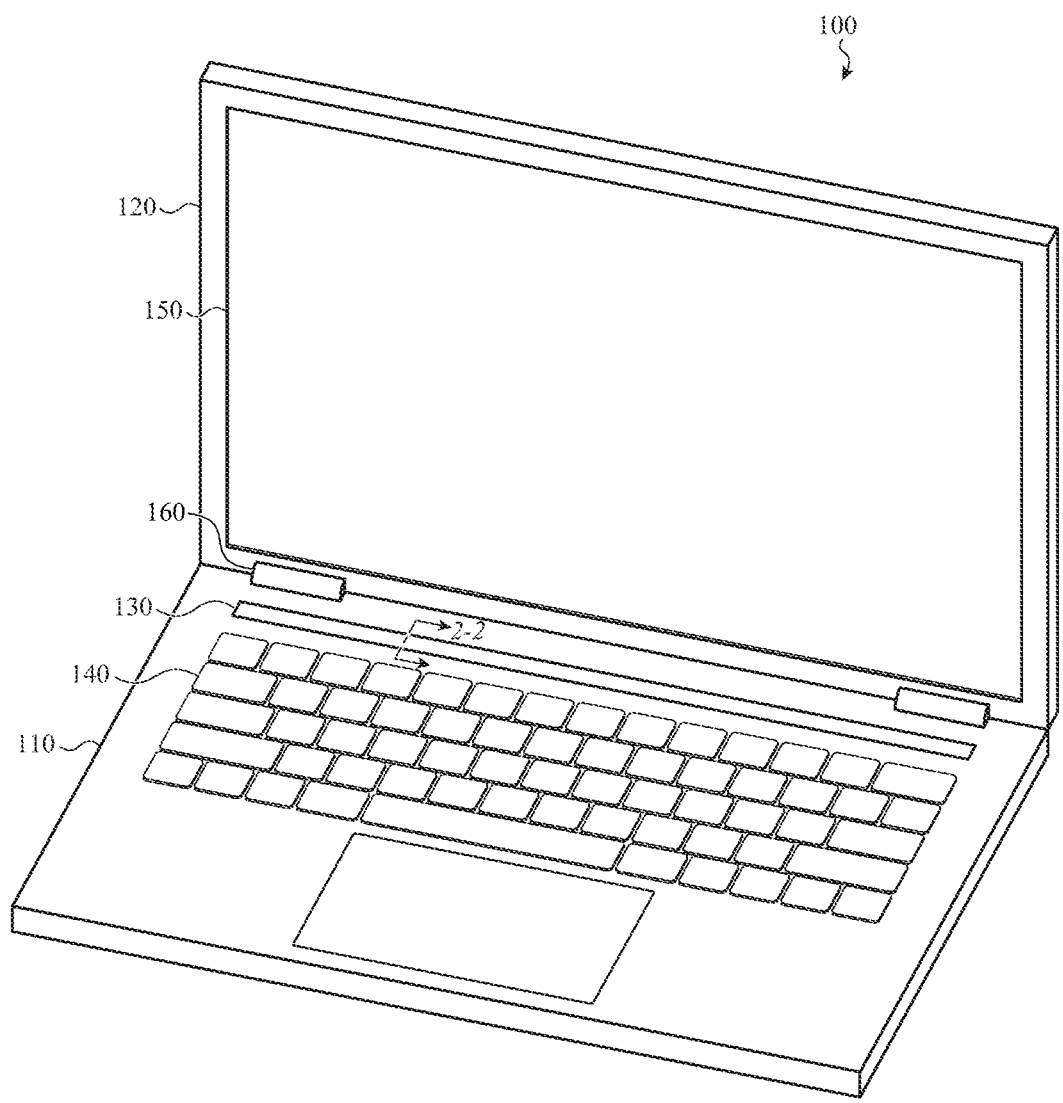
FIG. 1 illustrates a sample electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Embodiments described herein generally take the form of an electronic device including a primary and a secondary display; at least the secondary display is both touch- and force-sensitive and further has its force-sensing circuitry in-plane with the display. The secondary display and force-sensing circuitry may be encapsulated between two glass layers that are bonded to one another by a frit. The frit may at least partially encircle the display and force-sensing circuitry, or may fully encircle it. In embodiments where the secondary display and the force-sensing circuitry are fully encircled by the frit, one or more electrical lines, circuits, or the like may extend through the frit (or, in some embodiments, through one of the glass layers) to provide electrical communication and/or power between the display and/or force-sensing circuitry and other components of the electronic device. In some embodiments the force-sensing circuitry is formed from, or constitutes part of, the frit.

Certain embodiments may have a primary input mechanism, such as a keyboard, trackpad, or the like, positioned next to or near the secondary display. The secondary display may function as an additional or ancillary input mechanism and may, in some embodiments, extend a functionality of the primary input mechanism. The secondary display may further change one or more elements, icons, graphics, or the like shown on the display as a context of the user's interaction changes in order to provide content-sensitive inputs to the user. For example, as the user changes focus to, or otherwise selects or initiates, a program, application, or the like, the secondary display may change one or more user-selectable graphics, buttons, icons, soft keys, and so on to ones that are specific to the program, application, or other context.

In some embodiments, the electronic device is a laptop computer with a secondary display positioned near or next to a keyboard. The laptop computer may have an upper and lower portion connected to one another with a hinge; the keyboard and secondary display may be positioned in the lower portion. The primary display may be located in another part of the laptop computer, such as in the top portion. The lower portion may include a top case through which the keyboard and/or secondary display is accessed for user input and a bottom case connected to the top case such that the combination of the two form the (or a majority of, or a part of) exterior of the lower portion.

The secondary display may include circuitry for measuring an amount and/or location of a force exerted on its surface, thereby permitting force to be used as an input through the secondary display. Force-sensing circuitry may extend along one or more edges of the secondary display, or along portions of one or more edges of the secondary display. The force-sensing circuitry may sense force through changes in capacitance, resistance, optical properties, thermal properties, or the like resulting from a user (or object) exerting force on the display.

The display and force-sensing circuitry may be fully or partially encapsulated between a top glass layer and a bottom glass layer, where the top glass layer is positioned nearer the top case than the bottom glass layer. Likewise, the bottom glass layer is positioned nearer the bottom case than the top glass layer. A frit may bond the top glass layer to the bottom glass layer and fully or partially encircle the force-sensing circuitry and the secondary display. Power and/or signal lines may extend through the frit, the top glass, or the bottom glass and connect the display and/or the force-sensing circuitry to a power source, processing unit, or other elements of the electronic device.

The force-sensing circuitry may be coplanar with at least a portion of the display. For example, the force-sensing circuitry may be formed, deposited, or otherwise positioned on a common substrate with part of the display, such as the substrate on which the pixel circuitry is formed, deposited, or otherwise positioned.

In some embodiments using capacitive elements to measure force, the force-sensing circuitry may be mutually capacitive, while in others it may be self-capacitive. Self-capacitive force-sensing circuitry may measure a capacitance (or changes thereto) relative to a ground, such as the bottom case or top case, in order to determine a magnitude of an input force on the display.

The term "attached," as used herein, refers to two elements, structures, objects, parts, or the like that are physically affixed to one another. The term "coupled," as used herein, refers to two elements, structures, objects, parts, or the like that are physically attached to one another, operate with one another, communicate with one another, are in electrical connection with one another, or otherwise interact with one another. Accordingly, while two elements attached to one another are coupled to one another, the reverse is not required.

Turning now to FIG. 1, the electronic device 100 may be a laptop computer having a top portion 120 joined to a bottom portion 110 by a hinge 160. The laptop computer may include a primary display 150, which may be an OLED, LCD, LED, CCFL, LTPS, or other suitable display and may be positioned at least partially within the top portion 120. The primary display 150 may be touch- and/or force-sensitive in certain embodiments.

Continuing the example, a secondary display 130 of the laptop computer 100 may be any suitable display type as listed above, and may be the same type of display as the primary display 150 or may be different. Generally, although not necessarily, the secondary display 130 is touch-sensitive and force-sensitive; in some embodiments the secondary display may be force-sensitive but not touch-sensitive (or vice versa). The secondary display 130 may be positioned fully or partially within the bottom portion 110 and may provide a first input to the electronic device 100, such as a touch or force.

Additionally, an input mechanism, such as the keyboard 140, may be used to provide a second input, such as a key selection, to the laptop computer 100. The first and second inputs may be of the same type (e.g., force, touch, or the like) or may be of different types. The laptop computer 100 (or other electronic device) may have additional input mechanisms, as well. Sample additional input mechanisms include buttons, switches, keys, trackpads, mice, styluses, and so on.

Figure 2:
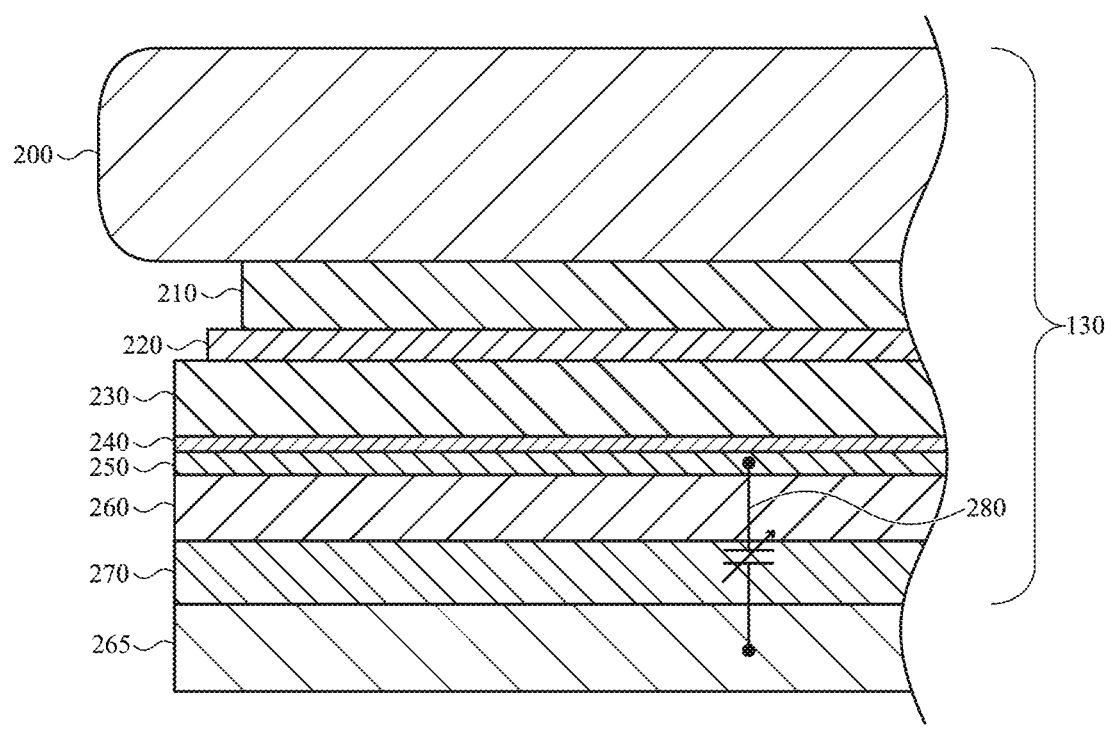
FIG. 2 is a cross-section of a display and a lower housing of the sample electronic device, taken along line 2-2.

As discussed above, the secondary display 130 may be force-sensitive. A cross-section the display and related force-sensing circuitry are shown in FIG. 2; this cross-section is taken along line 2-2 of FIG. 1. The sample embodiment of the secondary display 130, as shown, includes a cover 200, a polarizer 220, an optically clear adhesive 210 attaching the cover 200 to the polarizer 220, a top encapsulant 230, an optional shield layer 240, force-sensing circuitry 250, a display layer 260, which may implement any of the display technologies mentioned herein or any other suitable technology, a bottom encapsulant 265 (which, in some embodiments, may be a substrate on which the display layer 260 is formed, or that is otherwise a support or substrate of the display layer, or may be a separate element from the display layer), a compliant layer 270, and an enclosure attached to the bottom encapsulant 265 by the adhesive 210.

Generally the cover 200 is formed from glass, plastic, carborundum, or another suitable transparent material. A top or upper surface of the cover 200 (e.g., the surface at the top of FIG. 2) may be flush with an enclosure of the electronic device, such as the top case of the laptop computer shown in FIG. 1, or may protrude therefrom. The cover 200 typically flexes or otherwise deforms when an input force is exerted on it, although the amount the cover 200 flexes maybe visually and/or tactilely imperceptible to a user. By flexing, the cover 200 may transmit some or all of the input force through the display 130, thereby permitting the force-sensing circuitry 250 to operate as described below.

The optically clear adhesive 210 attaches the cover 200 to the rest of the display 130. In the embodiment shown in FIG. 2, the optically clear adhesive 210 attaches the cover 200 to the polarizer 220. Typically, the optically clear adhesive is transparent or near-transparent so that it does not inhibit, block, or otherwise degrade the quality of the display layer 260. Thus, in many embodiments the optically clear adhesive 210 is imperceptible (or near-imperceptible) to a viewer.

The polarizer 220 is optional and may be omitted in some embodiments. The polarizer typically enhances visibility of the display layer, for example by preventing internal and/or external reflections from degrading visibility of the display layer 260. The polarizer 220 may increase the display layer's contrast, as one example.

The top encapsulant 230 is positioned between, and attached to, the polarizer 220 and the display layer 260. The top encapsulant 230 may be attached to a sidewall (not shown) that attaches the top encapsulant 230 to a bottom encapsulant 265 such that the combination of top encapsulant 230, sidewall, and bottom encapsulant 265 fully, substantially or partially surrounds the display layer 260. The top encapsulant 230 is formed from glass in many embodiments, but may be made from crystal, plastic or another polymer, or other suitable materials in other embodiments. Generally, the top encapsulant 230 is fully or nearly transparent so that it does not obscure the display layer 260.

As mentioned, the top encapsulant 230, sidewall, and bottom encapsulant 265 may cooperate to surround the display layer 260. Further, in some embodiments the display layer, or a portion thereof, may abut any or all of the top encapsulant, sidewall, and bottom encapsulant. In some embodiments there is no intervening layer or gap between the bottom of the top encapsulant 230 and the top of the display layer 260, or at least no designed intervening layer or gap. For example, although the shield layer 240 and force-sensing circuitry 250 (as discussed below) are shown as positioned between the top encapsulant 230 and the display layer 260, in many embodiments one or both of these are co-planar with the display layer. As used herein, a first layer or element is "co-planar" with a second layer or element if a surface of the first layer or element is planar with a surface of the second layer or element. Typically, such surfaces are either the top surface, bottom surface, or both top and bottom surfaces of the first and second layers/elements. Parallel surfaces of two elements or layers are not co-planar unless the surfaces lie in the same plane as one another; the fact that a plane intersects and passes through two such surfaces does not render the corresponding layers co-planar.

By contrast, a first layer or element is "co-located" with a second layer or element if the first element's or layer's upper and lower surfaces do not extend above or below the upper and lower surfaces of the second element, respectively. Put another way, the first layer/element is co-located with the second layer or element if: 1) the second layer/element is at least as thick as the first layer/element; and 2) top and bottom surfaces of the second layer/element are co-planar or extend further than top and bottom surfaces of the first layer/element. Thus, it is possible for one layer to be co-located with a second layer while the reverse is not true. As one example, this can happen where a second layer is thicker than a first layer; the first layer would then be co-located with the second layer, while the second layer is not co-located with the first layer. As another example, in an embodiment where the second layer's top surface extends beyond the top surface of the first layer, but the bottom surfaces of the first and second layers are co-planar, then the first and second layers are co-planar, the first layer is co-located with the second layer, and the second layer is not co-located with the first layer.

It should be appreciated that references to "top," "bottom," "upper," and "lower" are intended to be with reference to a device in a rest and/or operating position. Thus, where the device is a laptop computer, a "top surface" is a surface nearest a top case and a bottom surface is one nearest a bottom case, as one example. Where the electronic device is a tablet, phone, watch, or the like, a "top surface" may be the surface nearest a display or a cover of the device while a "bottom surface" may be one nearest a part of the device's enclosure on an opposite side of the device from the display and/or cover.

Still with respect to FIG. 2 and bearing in mind the above, it should be appreciated that the shield layer 240 and force-sensing circuitry 250 are shown as non-co-planar with the display layer 260 for ease of illustration, although in many embodiments one or both such layers are co-planar with the display layer. For example, a bottom surface of the display layer 260 may be on the same plane as a bottom surface of the force-sensing circuitry 250, while a top surface of the display layer 260 may be on the same plane as a top surface of the shield layer 240. Thus, in some embodiments, the display layer 260 is co-planar with both the shield layer 240 and the force-sensing circuitry 250. In other embodiments, the display layer may not be co-planar with either or both of the shield layer and force-sensing circuitry.

Typically, neither the shield layer 240 nor the force-sensing circuitry 250 extends over the portions of the display layer 260 that are visible through the cover 200, so that they do not block the display layer from being visible outside the electronic device 100. The shield layer 240 may be positioned above or below the force-sensing circuitry 250, in order to shield the circuitry from parasitic capacitances (or other undesired electrical phenomena) that may interfere with the operation of the force-sensing circuitry. For example, in embodiments that include touch-sensing circuitry (e.g., a touch sensor), the shield layer 240 may be positioned between the touch-sensing circuitry and the force-sensing circuitry 250. Likewise, in some embodiments the shield layer 240 may be positioned between the display layer 260 and the force-sensing circuitry 250, or between a battery and the force-sensing circuitry.

The display layer 260 may be an LTPS (e.g., low-temperature polysilicon) layer configured to emit light from light-emitting elements, such as pixels to form images, graphics, words, icons, and so forth. In other embodiments, the display layer 260 may be implemented with a different display technology, as described herein. The display layer 260 may be flexible such that it bends, deforms, or otherwise moves (at least locally) when an input force is exerted on the cover 200.

In some embodiments a touch sensor (not shown) may be positioned between the cover 200 and the display layer 260 and configured to detect a location of a touch and/or input force on the cover. (Typically, although not necessarily, the touch exerts the input force on the cover 200.) The touch sensor may be a capacitive sensor, a resistive sensor, an optical sensor, or the like.

The display layer 260 may rest on, be formed on, or otherwise be supported by a bottom encapsulant 265. In some embodiments the bottom encapsulant 265 may be a substrate of the display layer 260, such as a flex, metal, glass, or plastic material. The light-emitting elements of the display layer 260 may be formed on the bottom encapsulant 265. In other embodiments, the bottom encapsulant may be positioned below the substrate of the display layer 260. The bottom encapsulant 265 may function as a mirror to reflect light emitted from the display layer in order to increase brightness of the display 130, although this is not necessary nor is it the case in all embodiments. Some embodiments may employ a separate mirror between the bottom encapsulant 265 and display layer 260, one positioned below the bottom encapsulant, or may omit a mirror entirely.

As mentioned above, the top encapsulant 230 is generally attached to the bottom encapsulant 265 by a sidewall. This is discussed in more detail below with respect to FIG. 3. Generally, however, the encapsulating structure formed by the top encapsulant 230, sidewall, and bottom encapsulant 265 flexes, bends, or otherwise deforms in response to an input force exerted on the cover.

A compliant layer 270 may be positioned between the bottom encapsulant 265 and the bottom portion 110; in the example shown in FIG. 2, the bottom portion 110 is the bottom case of the bottom portion of the laptop computing device 100 shown in FIG. 1. In some embodiments an internal metal (or other electrically conductive) support or structure may be substituted for the bottom portion 110. As one example, a midplate of a smart phone, tablet, or other electronic device may be positioned below the compliant layer 270. An adhesive, such as a Mylar adhesive or other heat-sensitive or pressure-sensitive adhesive, may attach the compliant layer to the bottom portion 110.

The compliant layer 270 may be formed from polysilicon, rubber, a gel, a polymer, and so on. In some embodiments holes, voids, gaps, or the like may be present in the compliant layer 270 to permit the layer to compress or otherwise deform.

Generally, the compliant layer 270 deforms, compresses, or otherwise permits the force-sensing circuitry 250 to move toward the bottom portion 110 (or other support or structure) in response to an input force exerted on the cover 200. In certain embodiments, the input force deflects the cover 200, optically clear adhesive 210, polarizer 220, the encapsulating structure formed by the top encapsulant 230, bottom encapsulant 265 and sidewall, the display layer 260 positioned within the encapsulating structure, and the force-sensing circuitry 250 positioned within the encapsulating structure, thereby compressing or otherwise deforming the compliant layer 270. Typically, the bottom portion 110 does not deflect or bend in response to the input force, or deflects or bends less than the compliant layer 270 and other layers or elements.

Accordingly, when an input force is exerted on the cover 200, the force-sensing circuitry 250 moves closer to the bottom portion 110 (or closer to a midplate or other structural element used in place of the enclosure). The force-sensing circuitry 250 is configured to measure an electrical property with respect to the bottom portion 110; this electrical property changes as the distance between the force-sensing circuitry 250 and the bottom portion changes.

As one example, a value of a capacitance 280 between the force-sensing circuitry 250 and bottom portion 110 may be defined by a distance between the force-sensing circuitry and enclosure. As this distance decreases, the capacitance 280 increases. Likewise, as this distance increases, the capacitance 280 decreases. The force-sensing circuitry 250 may measure a value (such as a magnitude) of the capacitance 280. Thus, as the force-sensing circuitry 250 moves toward the bottom portion 110 in response to an input force, the circuitry may detect a corresponding change in capacitance 280. This change in capacitance may be used by a processing unit of the electronic device 100 to estimate the input force.

Generally, at least the cover 200, the top encapsulant 230, bottom encapsulant 265, display layer 260, and force-sensing circuitry 250 deform locally in response to the input force. Put another way, portions of these layers or elements that are closer to a point at which the input force is exerted deflect or otherwise move more than portions of these layers or elements that are further away from the point. Thus, and as discussed in more detail below with respect to FIGS. 4A and 4B, the force-sensing circuitry 250 (or an associated processing unit) may be able to determine an approximate location at which an input force is exerted as well as the amount of the input force.

Figure 3:
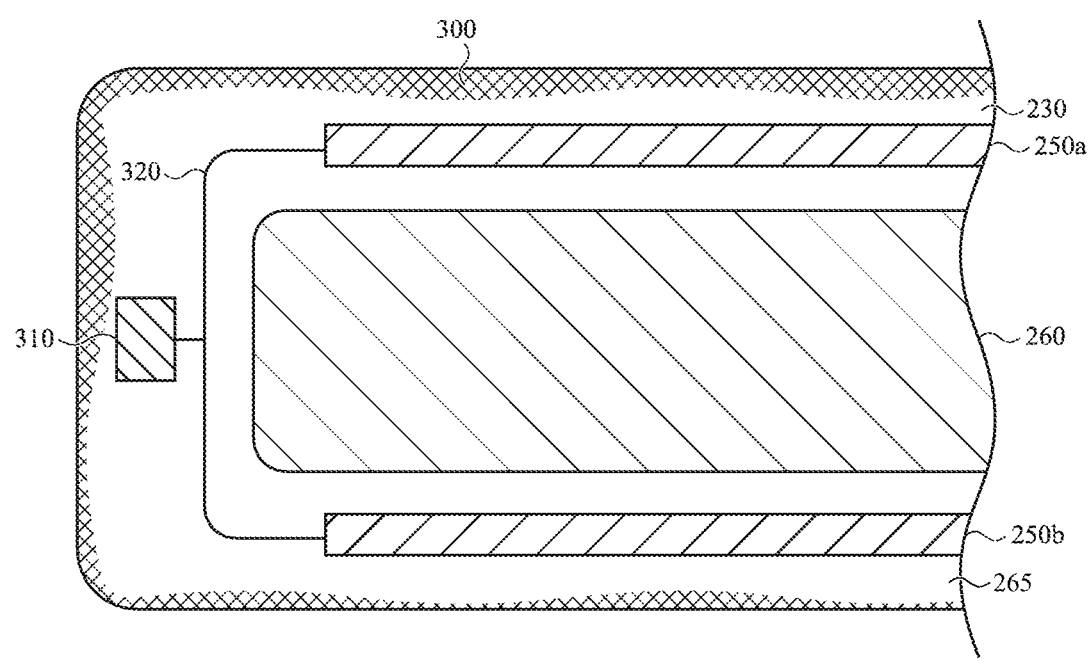
FIG. 3 shows a top cross-sectional view of the display of FIG. 2, illustrating force-sensing circuitry surrounding part of the display.

FIG. 3 generally shows a top view of the force-sensing circuitry 250a, 250b and display layer 260 as positioned on the bottom encapsulant 265. In the orientation shown in FIG. 3, the top of the laptop computing device 100 shown in FIG. 1 is toward the viewer, the read of the laptop computing device 100 (e.g., the hinged section of the laptop) is toward the top of the figure, and the front of the laptop computing device (e.g., the edge of the bottom portion that is opposite the hinge) is toward the bottom of the figure. Generally, the cross-section shown in FIG. 3 is substantially parallel to the top case of the bottom portion 110 shown in FIG. 1.

The sidewall 300 is illustrated in FIG. 3. This sidewall 300 attaches the top encapsulant 230 (shown in FIG. 2) to the bottom encapsulant 265 and cooperates with both top and bottom encapsulants to form the encapsulating structure discussed above. The encapsulating structure typically encloses or encircles the display layer 260 and the force-sensing circuitry 250a, 250b. In the embodiment of FIG. 3, the sidewall 300 extends along an entire outer edge or perimeter of the bottom encapsulant 265 such that it forms a barrier between an external environment and the force-sensing circuitry 250a, 250b and display layer 260.

In some embodiments the force-sensing circuitry 250a, 250b may be positioned within the sidewall rather than inside a cavity defined by the encapsulating structure. That is, the sidewall may extend over the force-sensing circuitry. This may seal the force-sensing circuitry within the sidewall 300. The force-sensing circuitry 250a, 250b may be contained within the sidewall 300 (or within a combination of the sidewall 300 and bottom encapsulant 265) in embodiments where the force-sensing circuitry is formed from a frit metal that facilitates bonding the sidewall to the bottom encapsulant, as one example. As another, the force-sensing circuitry may be positioned on the bottom encapsulant, or another substrate, and the sidewall formed over the circuitry.

FIG. 3 also illustrates an input/output contact 310 of the force-sensing circuitry 250a, 250b, which may be an electrical circuit. The input/output contact 310 may provide a drive signal to the force-sensing circuitry 250a, 250b and/or accept an output signal from the force-sensing circuitry (which may be or correspond to a measured change in an electrical property, such as capacitance, resistance, current, voltage, and so on). The input/output contact 310 may be connected to the force-sensing circuitry 250a, 250b by one or more electrical traces 320 or other electrical circuits. As with the force-sensing circuitry, the input/output contact 310 may be within the sidewall 300 or within the encapsulating structure. In some embodiments the input/output contact 310 extends through the encapsulating structure and permits electrical communication with other parts of the electronic device 100, such as a processing unit. In some embodiments the input/output contact 310 may be or include a processing unit.

As with the force-sensing circuitry 250a, 250b, the input/output contact 310 and/or the traces 320 may be formed from a frit metal or a portion of a frit metal. Generally, the frit metal is used during construction of the encapsulating structure to bond the sidewall to the top encapsulant or bottom encapsulant; in some cases the frit metal may bond the top encapsulant to the bottom encapsulant. The frit metal may be heated by a laser (or other heat source) and distribute that heat to the sidewall or one of the encapsulating layers, thereby promoting melting of the sidewall and/or encapsulating layer to encourage bonding and formation of the encapsulating structure. The frit metal may be deposited to form the force-sensing circuitry 250a, 250b, traces 320, or input/output contact 310 prior to heating and formation of the encapsulating structure, and may operate accordingly after the encapsulating structure is formed and the electronic device 100 assembled.

In some embodiments, a glass powder, glass frit, or the like may be used to form the sidewall, optionally in combination with the frit metal described above. The glass may be melted to bond to the top and bottom encapsulants. Heating the frit metal, if present may facilitate melting the glass to form the sidewall and/or attach the top encapsulant to the bottom encapsulant.

In some embodiments, the frit metal may form the input/output contact 310 and may pass through the sidewall 300, the top encapsulant and/or the bottom encapsulant. Further, the frit metal may be segmented to form multiple elements, including multiple instances of force-sensing circuitry 250a, 250b, multiple traces 320, and/or multiple input/output contacts 310. Likewise, in some embodiments any or all of the foregoing may be formed from material other than the frit metal. In still further embodiments any of the foregoing elements may be routed through the sidewall 300, the top encapsulant 230, or the bottom encapsulant 265. Further, in many embodiments the drive and/or sense traces 320 may be routed co-planarly with routing for the display layer 260 and may share a substrate with such routing, thereby reducing or eliminating any need for a separate routing layer.

The force-sensing circuitry 250a, 250b may be separately capacitively coupled to the bottom portion 110 (as shown in FIG. 2), such that each instance of the force-sensing circuitry 250a, 250b has its own capacitance with respect to the bottom portion 110, moves separately from one another under an input force, and thus experiences its own change in capacitance in response to an input force. In certain embodiments the force-sensing circuitry 250a, 250b may be mutually capacitive rather than self-capacitive with respect to the bottom portion 110.

Figure 4A:
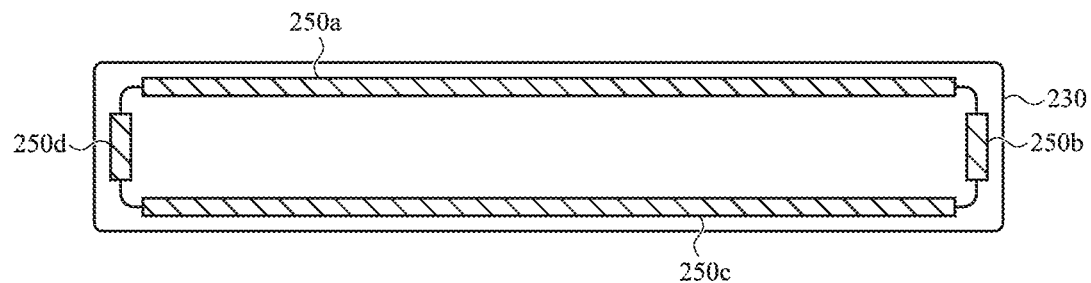
FIG. 4A shows a schematic view of one sample configuration of example force-sensing circuitry.
Figure 4B:
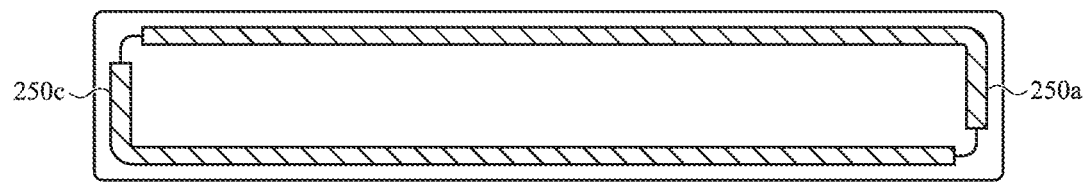
FIG. 4B shows a second schematic view of a second sample configuration of example force-sensing circuitry.

FIGS. 4A and 4B illustrate sample layouts of force-sensing circuitry 250a, 250b, 250c, 250d on an encapsulant layer 230. For simplicity of illustration, the display layer 260 and input/output contact 310 are omitted from both FIG. 4A and FIG. 4B. It should be appreciated that the examples of FIGS. 4A and 4B are not exhaustive but instead are illustrative.

As shown in FIG. 4A, four instances of force-sensing circuitry 250a, 250b, 250c, 250d may be positioned such that each is near a different edge of an encapsulant layer 230 and surrounds a display layer 260. An input force exerted on a cover would cause localized deformation resulting in a unique change in capacitance for each of the instance of force-sensing circuitry, insofar as the change in capacitance for each instance of the force-sensing circuitry varies with the distance of each circuitry from the point of greatest deformation of the encapsulant layer 230 (or other substrate on which the circuitry is positioned). Thus, a processing unit connected to the force sensing circuits 250a, 250b, 250c, 250d may use their measured changes in capacitance to determine an approximate location of the cover on which the input force is exerted.

FIG. 4B shows an embodiment having two force-sensing circuits 250a, 250c. Accordingly, while this embodiment may be able to determine which of the force-sensing circuits is nearer the location of the input force, it may not determine the input force's location with the same accuracy as the embodiment of FIG. 4A, or may be able to determine the input force's location along one axis of a plane intersecting the force sensing circuits 250a, 250c rather than both an X and Y coordinate within that plane.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A computing device, comprising:
an enclosure defining an exterior of the computing device;
a display assembly comprising a display, the display assembly positioned at least partially within the enclosure and defining a user input surface;
a sidewall extending about at least one side of the display;
a first force-sensing circuitry positioned within a first portion of the sidewall or between the display and the first portion of the sidewall; and
a second force-sensing circuitry positioned within a second portion of the sidewall or between the display and the second portion of the sidewall;
a processing unit communicatively coupled to the first force-sensing circuitry and the second force-sensing circuitry, wherein:
each of the first force-sensing circuitry and the second force-sensing circuitry is configured to receive a drive signal; and
in response to a force input at the user input surface at a position along the user input surface, the first force-sensing circuitry is configured to output a first signal and the second force-sensing circuitry is configured to output a second signal, each of the first signal and the second signal corresponding to a respective capacitance with respect to the enclosure;
the processing unit is configured to determine the position of the force input based on a change in relative capacitance between first and the second signals.

2. The computing device of claim 1, wherein:
the first force-sensing circuitry is coupled to a contact via a first electrical trace; and the second force-sensing circuitry is coupled to the contact via a second electrical trace.

3. The computing device of claim 1, wherein:
the enclosure comprises:
  a top portion;
  a bottom portion; and
  a hinge connecting the top portion to the bottom portion;
the display assembly is a secondary display assembly in the bottom portion of the enclosure; and
the computing device further comprises:
  a keyboard in the bottom portion; and
  a primary display assembly in the top portion.

4. The computing device of claim 1, further comprising a glass cover attached to the enclosure and positioned over the display, the sidewall, the first force-sensing circuitry, and the second force-sensing circuitry.

5. The computing device of claim 1, wherein the first force-sensing circuitry comprises a frit metal.

6. The computing device of claim 1, further comprising:
a top encapsulant above the display, the sidewall connected to the top encapsulant; and
a bottom encapsulant below the display, the sidewall connected to the bottom encapsulant.

7. The computing device of claim 6, further comprising:
a cover positioned over the top encapsulant;
a polarizer positioned between the cover and the top encapsulant; and
an adhesive layer positioned between the polarizer and the cover.

8. A laptop, comprising:
a housing comprising a sidewall;
a display assembly comprising a display, the display assembly positioned at least partially within the housing, the display assembly defining a user input surface;
a cover defining a user input surface positioned over the display;
a first force-sensing circuitry positioned between the display and the cover, the first force-sensing circuitry configured to output a first signal, corresponding to a first change in capacitance with respect to the housing, in response to a user input applied to the user input surface;
a second force-sensing circuitry positioned between the display and the cover, the second force-sensing circuit configured to output a second signal, corresponding to a second change in capacitance with respect to the housing, in response to the user input applied to the user input surface;
a processing unit communicatively coupled to the first force-sensing circuitry and the second force-sensing circuitry, wherein:
  in response to a force of a user input at a position along the user input surface, the first force-sensing circuitry is configured to output the first signal and the second force-sensing circuitry is configured to output the second signal; and
  the processing unit is configured to determine the position of the force input based on a change in relative capacitance between the first and the signals.

9. The laptop of claim 8, wherein:
the first and second force-sensing circuitry is positioned at least partially within the sidewall; and
the sidewall extends about at least one side of the display.

10. The laptop of claim 8, further comprising:
a top encapsulant positioned above the display; and
a bottom encapsulant positioned below the display, wherein the sidewall couples the top encapsulant to the bottom encapsulant.

11. The laptop of claim 8, wherein the cover is configured to deform in response to the force of the user input applied to the user input surface.

12. The laptop of claim 8, wherein the housing is a bottom housing of the laptop and the laptop further comprises:
a top housing pivotably coupled to the bottom housing;
a primary display positioned with the top housing; and
a keyboard positioned within the bottom housing.

13. A portable computing device, comprising:
an enclosure having:
  a top portion comprising a primary display; and
  a bottom portion hingably coupled to the top portion;
a keyboard housed in the bottom portion;
a secondary display comprising a display layer, the secondary display housed in the bottom portion;
a cover layer disposed over the secondary display and defining a user input region;
a first force-sensing circuitry adjacent the secondary display and configured to measure a first change in capacitance with respect to the enclosure in response to a user input force applied to the user input region;
a second force-sensing circuitry adjacent the secondary display and configured to measure a second change in capacitance with respect to the enclosure in response to the user input force applied to the user input region;
a processing unit communicatively coupled to the first force-sensing circuitry and the second force-sensing circuitry, wherein:
  in response to the user input force at a particular position along the user input surface, the first force-sensing circuitry is configured to output the first signal and the second force-sensing circuitry is configured to output the second signal; and
  the processing unit is configured to determine the particular position of the user input force based on a change in relative capacitance between the first and the signals.

14. The portable computing device of claim 13, wherein:
the cover layer is configured to deform in response to the user input force; and
the display layer is configured to move in response to the user input force.

15. The portable device of claim 14, wherein:
the cover layer comprises glass; and
the display layer is configured to bend in response to the user input force.

16. The portable device of claim 13, further comprising a touch sensor positioned between the cover layer and the display layer.

17. The portable device of claim 13, wherein:
the first force-sensing circuitry is positioned a first distance from an edge of the secondary display; and
the second force-sensing circuitry is positioned a second distance, different from the first distance, from the edge of the secondary display.

18. The portable device of claim 13, wherein:
the first force-sensing circuitry is positioned parallel with respect to the secondary display; and
the second force-sensing circuitry is positioned perpendicular with respect to the first force-sensing circuitry.

* * * * *